United States Patent
Garcia et al.

3,938,140
Feb. 10, 1976

[54] DATA DISPLAY DEVICE

[75] Inventors: Jean Garcia; Michel Hareng; Eugene Leiba, all of Paris, France

[73] Assignee: Thomson-CSF, Paris, France

[22] Filed: May 6, 1974

[21] Appl. No.: 467,562

[30] Foreign Application Priority Data
May 9, 1973 France .............. 73.16737

[52] U.S. Cl. ............ 340/336; 313/513; 350/160 LC
[51] Int. Cl.² ............................................ G08B 5/36
[58] Field of Search ......... 340/336, 378 R; 313/510, 313/513, 520; 350/160 LC

[56] References Cited
UNITED STATES PATENTS

| | | | |
|---|---|---|---|
| 2,307,173 | 1/1943 | Vian | 340/336 |
| 3,716,290 | 2/1973 | Borel et al. | 340/336 |
| 3,776,615 | 12/1973 | Tsukamoto et al. | 340/324 M |

*Primary Examiner*—David L. Trafton
*Attorney, Agent, or Firm*—Cushman, Darby & Cushman

[57] ABSTRACT

The invention relates to data display devices having a segmented structure. It provides a display device whose adjacent coplanar segments are divided up into complementary areas respectively connected to excitation units controlled simultaneously in such manner as to produce, in the absence of break down, a homogeneous display of the segments. The invention applies to display by elementary sources of light or by liquid crystals and other materials having electro-optical properties.

9 Claims, 5 Drawing Figures

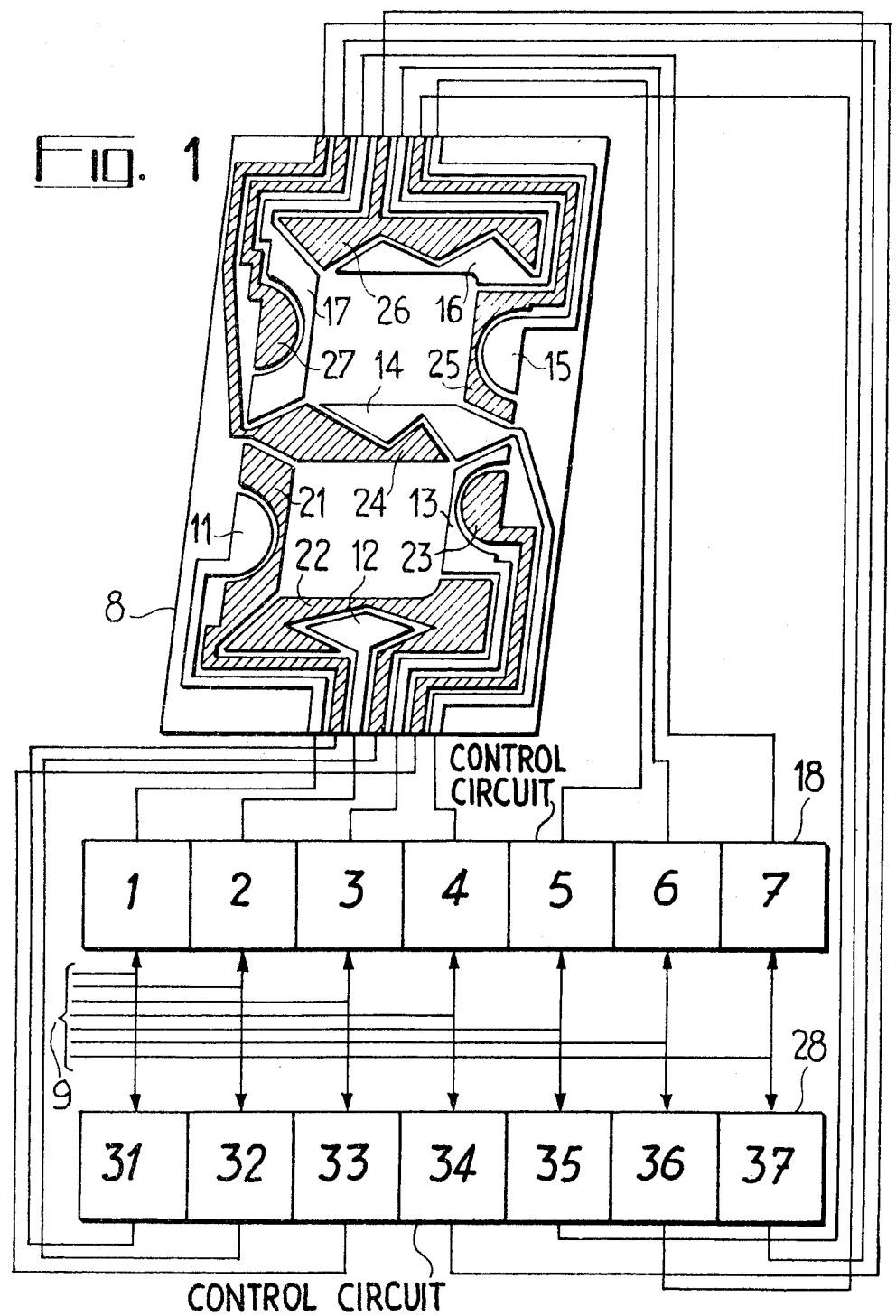

DATA DISPLAY DEVICE

The invention relates to devices for displaying data in the form of characters which can be split up into segments. The display of a character consists in rendering visible under the action of a group of electric signals a configuration of segments which evokes, without ambiguity, the shape of the character.

With a small number of coplanar segments arranged in a display window, it is possible to achieve multiple combinations of segments which are inscribed in said window and do not overlap. Such an arrangement facilitates the reading of the characters but has the drawback that the differenciation of two characters may depend on only a single segment which is absent from one of the configurations and appears in the other.

If the electric circuits exciting a display element break down, the character displayed may not correspond to the group of electric signals employed for defining it. An erroneous visual interpretation of these signals results.

This drawback inherent in the principle of the segmented display, concerns all known display techniques. It may concern display elements constituted by sources of light or display elements based on the optical modulation of a radiation supplied by a source outside the element. The display elements employing liquid crystals are of the latter type and are not devoid of the aforementioned drawback since they are generally constituted by a layer of liquid crystal whose faces are provided with segmented transparent electrodes.

The display of a character or graphical sign is achieved by applying to the electrode a combination of exciting voltages which renders more or less birefractive or diffusing certain areas of the layer of liquid crystal. It will be understood that a defect in the connection and/or an abnormal operation of the excitation circuit for the electrodes may completely modify the descriptive value of a displayed character.

In order to overcome this drawback, the invention proposes to divide each one of the segments constituting a display device into complementary areas and to control these areas separately by means of excitation circuits and redundant electric connections. When the excitation voltages applied to the areas of the same segment are concordant in their effects, a homogeneous display of the segment is achieved which thus validates it. On the other hand, as soon as the excitation voltages cease to be concordant for some reason, the display of the segment has an abnormal appearance which thus serves to invalidate the reading of the display device.

According to the present invention, there is provided a data display device comprising at least one segment whose form has a descriptive value, said form being rendered visible under the action of a control signal applied to means for exciting said segment, wherein said segment is formed by a plurality of complementary areas; said excitation means being divided into as many excitation units as there are areas in said segment; said excitation units being electrically connected to said areas through separate connections and being controlled simultaneously by said control signal.

For a better understanding of the invention as well as other objects and further features thereof, reference is made to the following detailed disclosure of the preferred embodiments of the invention taken in conjunction with the accompanying drawings thereof, wherein:

FIG. 1 represents a segmented display device according to the invention;

Figure 2C:
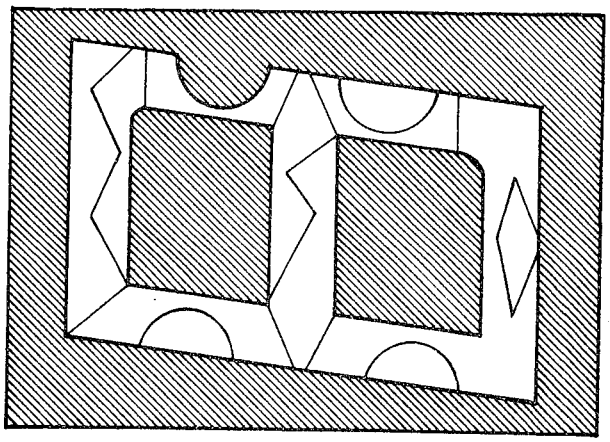
FIGS. 2a, 2b, 2c are explanatory Figures illustrating the operation of the device shown in FIG. 1.

The character display devices to which the present invention applies may be constituted in the known manner by one or more adjacent compartments which have a diffusing glass backing and are equipped internally with incandescent lights. By the selective lighting up of these lights, it is possible to make appear on the surface of the diffusing glass luminous segments which have the shape of the compartments.

According to a less cumbersome technique, there may be substituted for these sorts of light boxes electroluminescent diodes whose emitting surfaces also have the shape of coplanar segments.

According to a different technique illustrated in FIG. 1, a display device may be constructed which has no light sources. This device is constituted by a liquid crystal layer trapped between two transparent strips 8. At least one of these strips 8 carries a set of coplanar transparent electrodes which have the shape of adjacent segments.

In FIG. 1, these segments are 7 in number and are divided into two complementary areas. The areas 11–17 of the 7 segments are respectively complementary to areas 21–27 and all of the segments having two areas form in the plane of the figure a configuration which evokes the FIG. 8 when it is considered in its entirety.

The other strip 8, hidden by the first strip, carries a single counter electrode or a set of counter electrodes similar to the electrodes which face them.

When a voltage is applied between an electrode and a counterelectrode, the liquid crystal portion defined by the electrode and counter-electrode has its optical properties modified. This modification for example consists in the passage of the liquid crystal from the transparent state to the diffusing state or in a change in its birefractory properties or rotatory power.

In the presence of an appropriate illumination, it can be arranged that, by transparency or reflection, said segment of the display device changes in appearance when an electric excitation voltage is applied thereto. This change in appearance may consist in a change of colour or luminescence, which is achieved under the action of a d-c or a-c voltage furnished by excitation units 18 and 28. These units are composed of elementary cells 1–7 and 31–37. The excitation elements on cells 1–7 have their outputs respectively connected to the areas 11–17 of the segments; their inputs respectively receive a group 9 of seven binary control signals which determines those of the segments which must be rendered visible. The excitation elements or cells 31–37, which are homologous to the cells 1–7, receive the same group 9 of binary control signals; these cells 31–37 deliver excitation voltages which are applied, through a second set of separate connections, to the cross-hatched areas 21–27 of the segments of the display device.

In order to render the drawing more clear, there has been omitted an opaque frame provided with a window which limits the display area to a parallelogram; only the configuration of the transparent segments evoking the figure eight may be seen, the peripheral connections being hidden or opaque.

If the group 9 of control signals is solely constituted by Is, the excitation units 18 and 28 deliver at all their outputs excitation voltages which render completely visible all the segments of the display device. There is then seen the luminous figure eight as shown at (a) in FIG. 2. If the group 9 of control signals comprises Is except at the fourth place from left, it is the figure zero which is displayed since the horizontal median segment has become completely invisible. In the same way, by cancelling out certain other excitation voltages in the two units 18 and 28 simultaneously, it is possible to make appear any other figure between 0 and 9.

This operation is the same as if the segments had been constructed in one piece and supplied by a single excitation unit. However, owing to the doubling of the excitation unit, the electric connections and the segments, it is possible to detect any abnormal operation of the display device unless it simultaneously affected two homologous excitation paths. The probability of such a breakdown is exceedingly slight and may be reduced still more if necessary by splitting up the device still more.

Figure 2B:
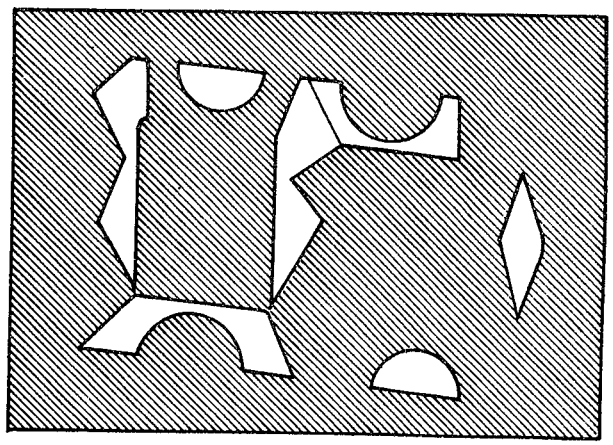
Figure 2A:
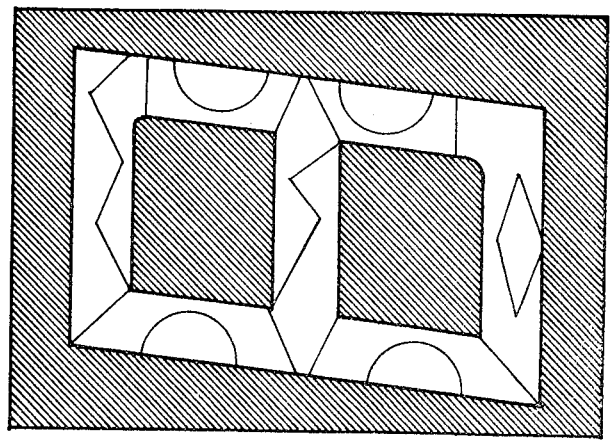

If the group 9 of control signs corresponds to the display of the figure eight, there is normally observed the configuration shown at (a) in FIG. 2. Assuming that a simple breakdown affects the cell 5 of the unit 18 and/or the connection connecting said cell to the electrode 15, the configuration shown at (c) in FIG. 2 is obtained. The notch seen on the right in the upper loop of the eight signals a danger of confusion. Indeed, if the segment concerned is complete a true eight is seen and if it is completely absent present a six is seen. Owing to this ambiguity, any anomaly affecting the inscription of a displayed figure is a cause for rejection. As it concerns a display device whose segments are not divided into fractions, there is nothing to ascertain the existence of a breakdown. Under these conditions, the breakdown may change a six into a eight or vice-versa without warning of a display error.

There has been shown at (b) in FIG. 2 the configuration relating to a more serious breakdown of the device shown in FIG. 1. It is equivalent to the non operation of the whole of the unit 28 and/or of its electric connections. This configuration no longer evokes any figure at all and it is impossible to read anything therefrom.

Thus it can be seen that in accordance with the invention the dividing up of the segments of a display device into fractions furnishes an indication of breakdown so long as it does not concerns all the excitation elements pertaining to the same segment.

In the case of liquid crystal elements or cells, the gain as concerns the reliability of the display distinctly prevails over the increased cost of manufacture, since the excitation circuits 18 and 28 are cheap components owing to their mass-production. The construction of the electrodes by the photoengraving method involves only a slight complication as concerns the design of the masks.

Figure 3:
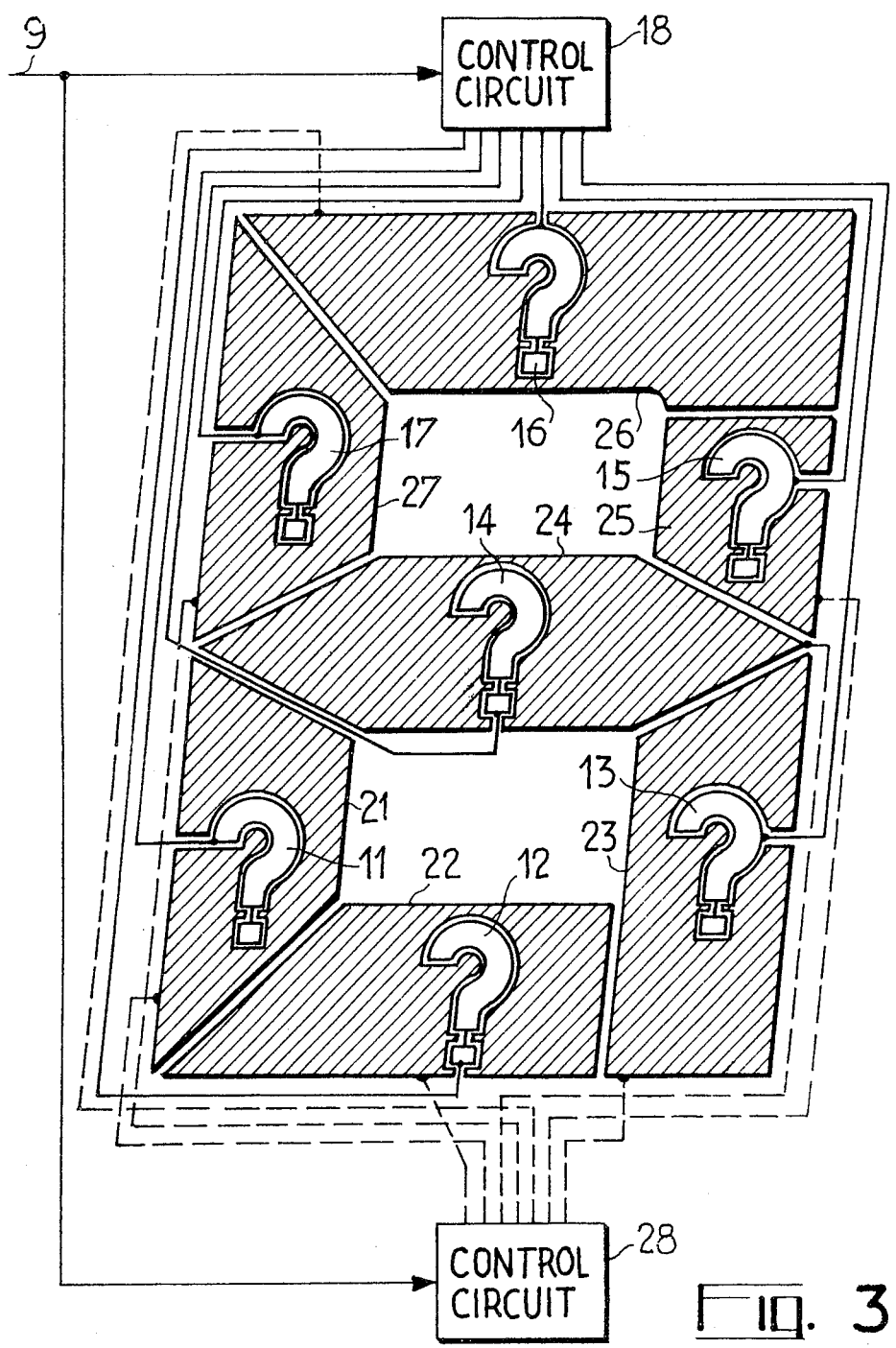
FIG. 3 represents a modification of the device shown in FIG. 1.

Without departing from the scope of the invention, the perception of a fault in the display may be improved by adopting a cutting out or arrangement of the segments as suggested by the design shown in FIG. 3.

It has been seen from FIG. 1 that the dividing line between the segments may be in accordance with a curved line, broken line or polygonal line and that, in the case of breakdown, there results a thin irregular display of the segments. The interpretation of an irregular line by an observer used to reading slightly mutilated indications is liable to result in an assimilation of this line to a normal line and thus validating an unsound display. On the other hand, a more suspicious observer would have a tendency to invalidate a valid display on the grounds that the lines do not appear to be homogeneous in their outline.

In order to avoid this type of uncertainty, the invention also teaches the cutting out of the segments in such manner that at least one of the complementary areas which constitutes it has a regular shape which directly evokes the ambiguity of the display.

In FIG. 3, there is shown a display device whose segments are similar to those shown in FIG. 1 and cut out in such manner as to contain a non-cross-hatched area in the form of a question mark.

When the excitation of the two parts of a segment is concordant, the segment is completely visible or invisible and it is impossible to notice the question mark that it contains.

On the other hand, as soon as the excitation of the two parts of a segment is discordant owing to a simple breakdown, the question mark is seen very distinctly since its stands out from a dark or luminous background, depending on whether it is illuminated or extinguished. It is sufficient that a single question mark appear for the entire display to be invalidated and this corresponds to the effect produced on any untrained observer.

FIG. 3 shows only a single reject-indicating sign in each segment, but it may also be repeated or a word ordering the rejet may even be provided.

The invention is in no way limited to the numerical or alpha-numerical display and is also applicable to the extreme case of a single segment having an overall descriptive value and at least one subdivision of this segment having another descriptive value capable of confirming or invalidating the first.

As has been seen, the invention is moreover not limited to a single type of display device. It concerns devices having incorporated light sources and those which are based on the use of liquid crystals or ferroelectrical materials; it applies to display based on the contrast of light intensities but also on the contrast of colours.

Of course, the invention is not limited to the embodiment described and shown which was given solely by way of example.

What is claimed is:

1. A data display device comprising at least one segment whose shape has a descriptive value, said shape undergoing a perceptible change in appearance under the action of a control signal applied to means for exciting said segment, wherein each said segment comprises a same number of complementary areas; said excitation means being divided up into as many excitation units as there are areas in each said segment; said units being electrically connected to said areas by separate connections and being controlled simultaneously by said control signal.

2. A display device as claimed in claim 1, comprising an assembly of coplaner adjacent segments which afford, by combination, separate configurations appearing in succession under the control of groups of control signals applied simultaneously to said excitation units.

3. A display device as claimed in claim 1, wherein each segment is embodied by a plurality of elementary sources of light which are respectively assigned to each one of said complementary areas.

4. A display device as claimed in claim 1, wherein each segment is constituted by a stack of a group of transparent elementary electrodes, a layer of material whose optical properties are modified under the action of an electrical field and at least one counter-electrode facing said group of electrodes; said elementary electrodes respectively defining said complementary areas.

5. A display device as claimed in claim 4, wherein said material is a liquid crystal.

6. A display device as claimed in claim 1, wherein the separations between said complementary areas have the shape of continuous lines intersecting the perimeter of said segment.

7. A display device as claimed in claim 1, wherein at least one of the areas of said segment has the form of an ambiguity-indicating graphical sign resulting from the incomplete excitation of said segment.

8. A display device as claimed in claim 1, wherein said segment comprises two complementary areas.

9. A display device as claimed in claim 7, wherein the form of said segment has a descriptive value peculiar to said segment and distinct from that of said graphical sign.

* * * * *